(12) United States Patent  
Schindler

(10) Patent No.: US 8,281,165 B2
(45) Date of Patent: *Oct. 2, 2012

(54) INLINE POWER CONTROLLER

(75) Inventor: Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,961

(22) Filed: Mar. 10, 2011

(65) Prior Publication Data

US 2011/0161693 A1  Jun. 30, 2011

Related U.S. Application Data

(60) Continuation of application No. 12/120,225, filed on May 13, 2008, now Pat. No. 7,930,568, which is a division of application No. 11/191,629, filed on Jul. 27, 2005, now Pat. No. 7,373,532.

(51) Int. Cl.
*G06F 1/00* (2006.01)
*G06F 15/173* (2006.01)

(52) U.S. Cl. ........................... 713/300; 709/224
(58) Field of Classification Search .................. 713/300; 709/224

See application file for complete search history.

(56) References Cited

U.S. PATENT DOCUMENTS

| | | | |
|---|---|---|---|
| 4,835,737 A | 5/1989 | Herrig et al. | |
| 5,122,691 A | 6/1992 | Balakrishnan | |
| 5,237,511 A | 8/1993 | Caird et al. | |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loundermilk | |
| 5,726,506 A | 3/1998 | Wood | |
| 5,742,513 A | 4/1998 | Bouhenguel et al. | |
| 5,758,102 A | 5/1998 | Carey et al. | |
| 5,775,946 A | 7/1998 | Briones | |
| 5,790,391 A | 8/1998 | Stich et al. | |

(Continued)

OTHER PUBLICATIONS

"3COM® NJ100 Network Jack Power," printed from http://www.poweroverethernet.com/manual/content/view/full/776/, 3Comm, Tuesday, Mar. 18, 2003.

(Continued)

*Primary Examiner* — Mark Connolly
(74) *Attorney, Agent, or Firm* — BainwoodHuang

(57) ABSTRACT

An inline power controller includes at least one analog interface circuit module (AICM) having a first analog input node for receiving an inline power port voltage, a second analog input node for receiving an inline power port current, a first analog output for effecting an inline power port voltage, a second analog output for effecting an inline power port current, and a digital interface converting the received inline power port voltage to a digital value, the inline power port current to a digital value, a first digital value to the first analog output and a second digital value to the second analog output. A digital serial bus (DSB) couples the AICM to a digital controller via digital serial bus interfaces (DSBIs).

20 Claims, 7 Drawing Sheets

U.S. PATENT DOCUMENTS

| | | | |
|---|---|---|---|
| 5,790,873 | A | 8/1998 | Popper et al. |
| 5,793,987 | A | 8/1998 | Quackenbush et al. |
| 5,796,185 | A | 8/1998 | Takata et al. |
| 5,809,256 | A | 9/1998 | Najemy |
| 5,834,925 | A | 11/1998 | Chesavage |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,496,105 | B2 | 12/2002 | Fisher et al. |
| 6,541,878 | B1 | 4/2003 | Diab |
| 6,701,443 | B1 | 3/2004 | Bell |
| 6,762,675 | B1 | 7/2004 | Cafiero et al. |
| 6,804,351 | B1 | 10/2004 | Karam |
| 7,373,532 | B2 * | 5/2008 | Schindler .................. 713/300 |
| 7,818,591 | B2 * | 10/2010 | Schindler .................. 713/300 |
| 7,930,568 | B2 * | 4/2011 | Schindler .................. 713/300 |
| 2005/0197094 | A1 | 9/2005 | Darshan et al. |
| 2006/0057967 | A1 | 3/2006 | Shimada |
| 2006/0112285 | A1 | 5/2006 | Stineman |
| 2006/0288101 | A1 | 12/2006 | Mastrodonato et al. |
| 2007/0136614 | A1 | 6/2007 | Heath et al. |

OTHER PUBLICATIONS

3Com User Guide—3Com IntelliJack, Model NJ220, Version 1.0, 3Com, Nov. 2003.

Mendelson, G., White Paper "All You Need to Know About Power Over Ethernet (PoE) and the IEEE 802.3af Standard," pp. 1-24, Jun. 2004.

"IEEE Standard 802.3af™," IEEE Standard for Information Technology—Telecommunications and Information Exchange Between Systems—Local and Metropolitan Area Networks—Specific Requirement, IEEE The Institute of Electrical and Electronics Engineering, Inc., Jun. 18, 2003.

International Search Report and Written Opinion, Application No. PCT/US06/29078, date Jun. 17, 2008.

* cited by examiner

INLINE POWER CONTROLLER

FIELD OF THE INVENTION

The present invention relates generally to networking equipment which is powered by and/or powers other networking equipment over wired data telecommunications network connections.

BACKGROUND OF THE INVENTION

Inline power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 820.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. Higher power levels are anticipated for the future. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pairs or four pairs of conductors although the present IEEE 802.3af standard only provides for power over two pairs. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2+Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard permits a 25,000 ohm resistor to be presented for discovery by the PD because it is within the permissible range of values (other values may be used instead in accordance with the standard). The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the 25,000 ohm identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0-5 | 15.4 |
| 1 | 8-13 | 4.0 |
| 2 | 16-21 | 7.0 |
| 3 | 25-31 | 15.4 |
| 4 | 35-45 | Reserved |

The discovery process is therefore used in order to avoid providing inline power (at full voltage of −48VDC) to so-called "legacy" devices which are not particularly adapted to receive or utilize inline power.

The classification process is therefore used in order to manage inline power resources so that available power resources can be efficiently allocated and utilized.

In wired data telecommunications networks it would be advantageous to provide improved means for efficiently handling inline power discovery, classification and provision and protection.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at inline power controllers. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
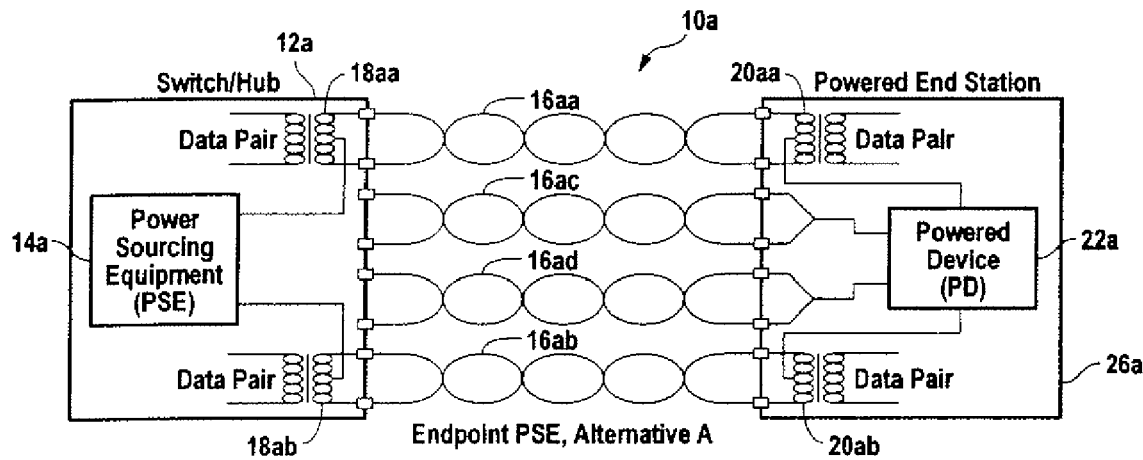
FIGS. 1A, 1B, 1C, 1D and 1E are electrical schematic diagrams of portions of data telecommunications networks in accordance with the prior art.
Figure 1B:
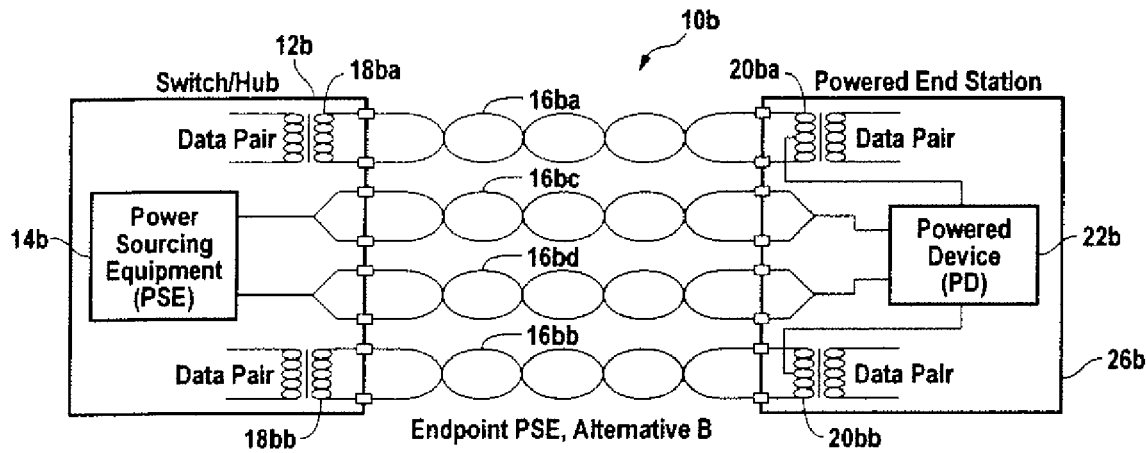
Figure 1C:
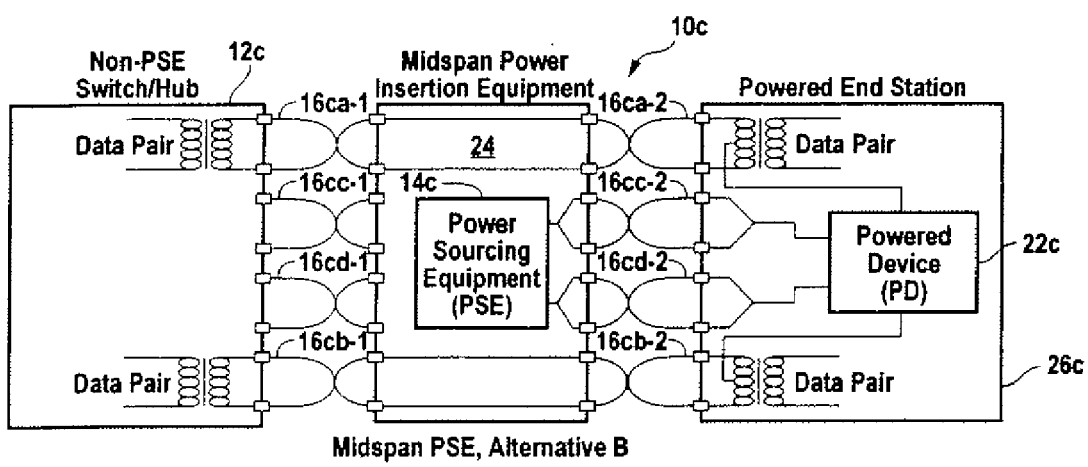
Figure 1D:
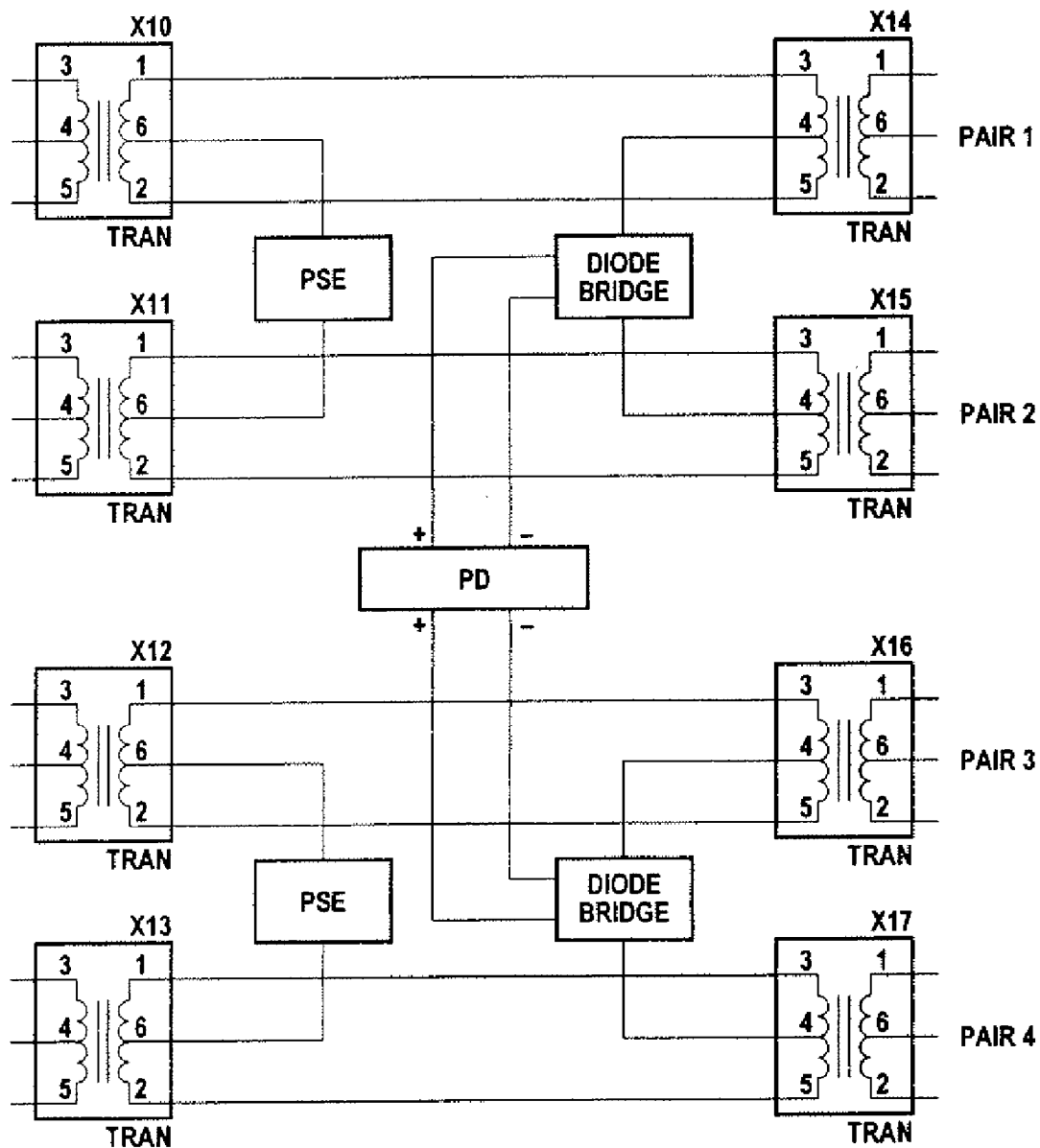
Figure 1E:
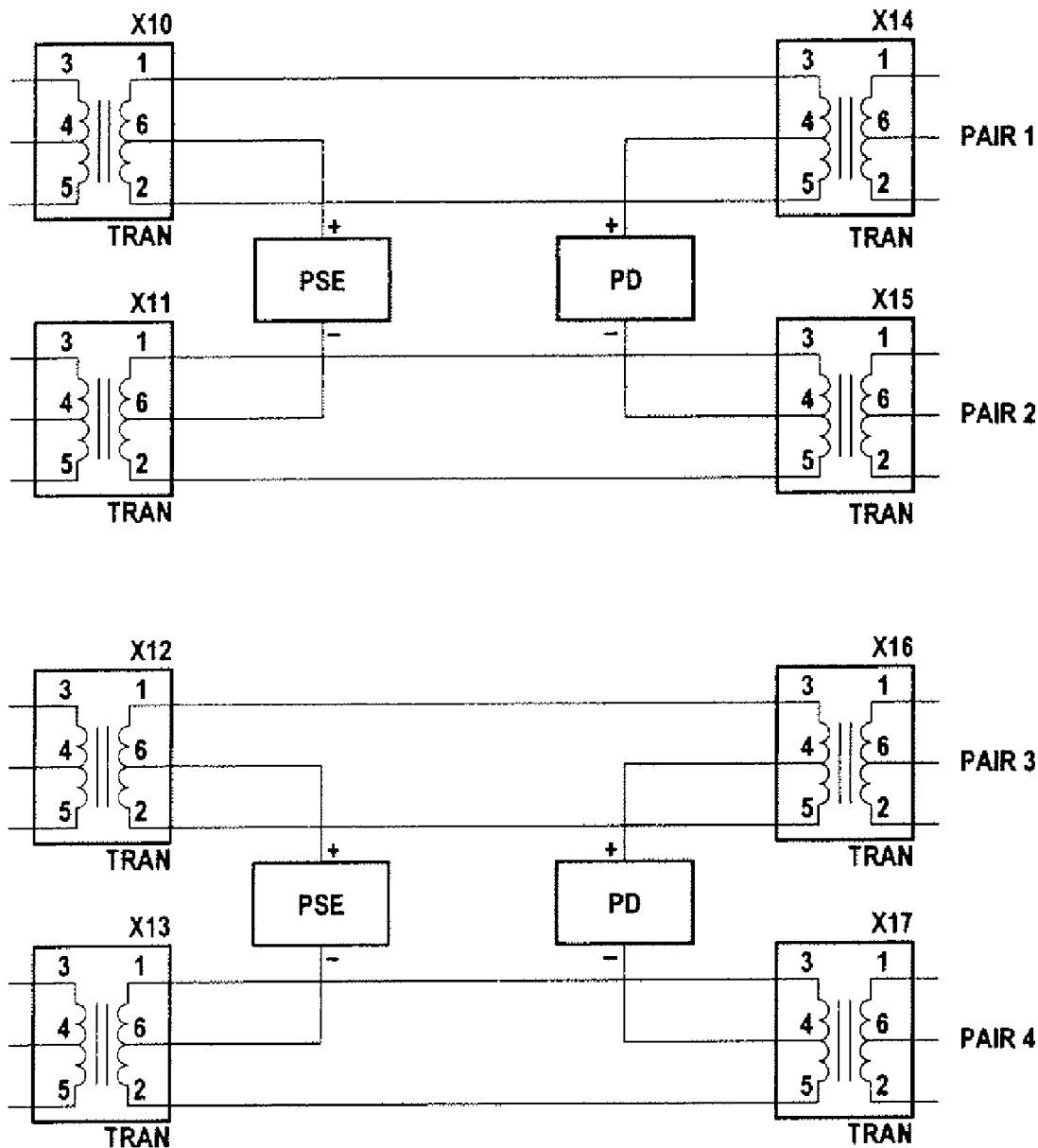
Figure 2:
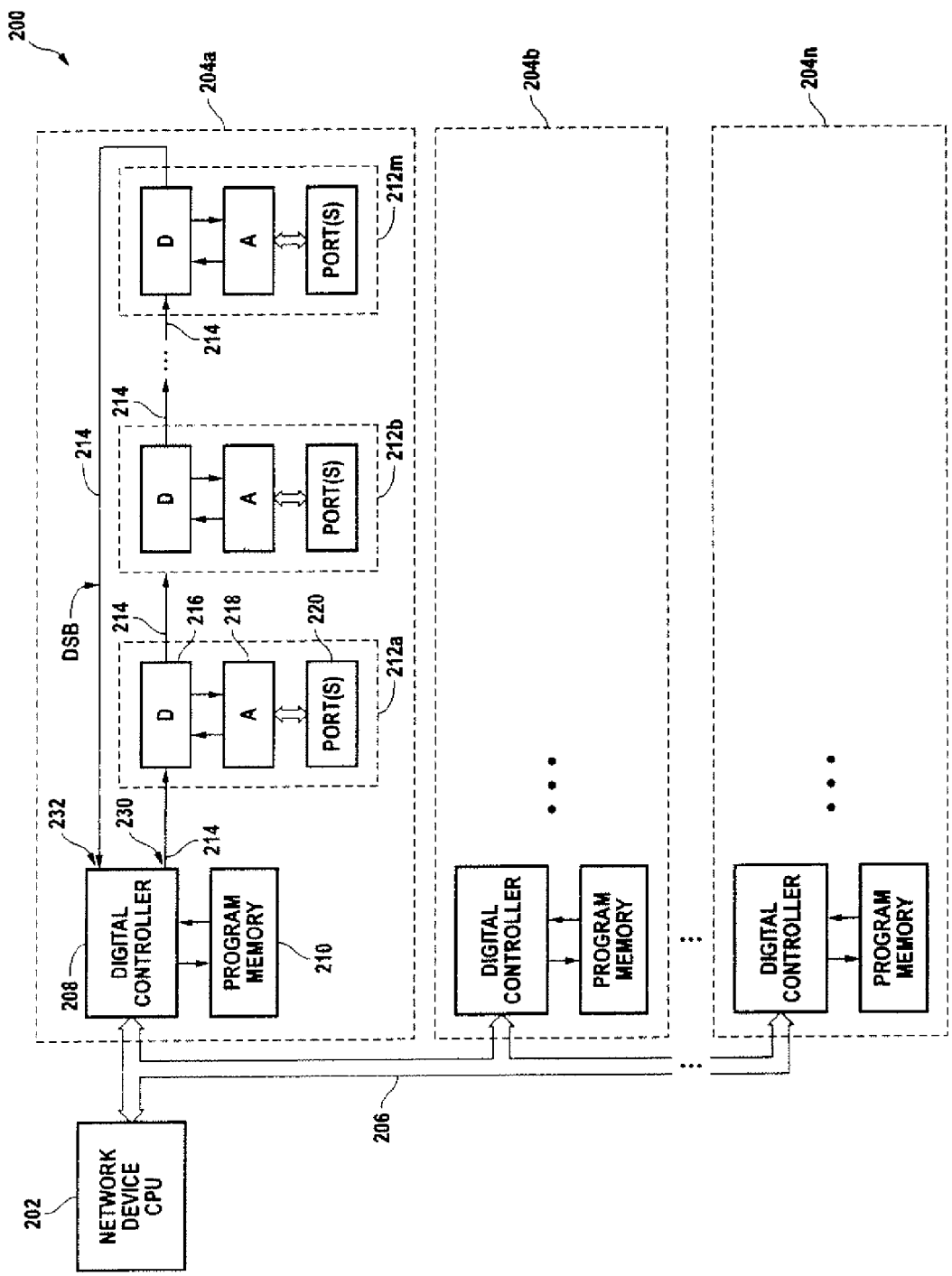
FIG. 2 is a system block diagram of a system including a network device CPU (central processing unit) and a plurality of coupled inline power controller circuits in accordance with one embodiment of the present invention.

FIG. 2 is a system block diagram of a system including a network device CPU (central processing unit) and a plurality of coupled inline power controller circuits in accordance with one embodiment of the present invention.

FIG. 2 illustrates a system for inline powered port control as might be found in a typical network device such as a switch, router or the like. In the embodiment 200 illustrated in FIG. 2, a network device CPU (central processing unit) 202 operating under the control of an operating system such as CISCO IOS® available from Cisco Systems, Inc. of San Jose, Calif., is coupled to one or more inline power controller modules 204a, 204b, . . . , 204n through a first communications bus 206 as shown. The CPU handles high-level communications between the network device and the respective inline power controller modules 204a, 204b, . . . , 204n as in known to those of ordinary skill in the art.

Inline power controller module 204a, for example, includes a digital controller 208 and a program memory 210 in which are stored instructions under which digital controller 208 operates. In one embodiment these may be updated from time to time via communications with CPU 202 by having CPU 202 download new instructions and storing them in program memory 210. Digital controller 208 communicates with one or more port analog interface circuit modules (AICMs) 212a, 212b, . . . , 212m over a loop-configured digital serial bus interface (DSB) 214 as shown. DSB 214 is implemented in one embodiment of the present invention as a single bit wide serial bus with each AICM 212a, 212b, . . . , 212m having a register of the same width and length so that digital signals to be transmitted to the various AICMs may be easily clocked out to them over the DSB and digital signals to be received from them may similarly be clocked back to the digital controller 208. It is also possible to use more than one bit of width in the DSB, depending upon the speed of the devices used, the amount of data to be conveyed, and the refresh rate required by the particular application. A digital serial bus interface (DSBI) is provided at each device that needs to interface with the DSB 214.

AICM 212a includes a digital component 216, an analog component 218 and one or more inline-powered ports for providing inline powered data telecommunications in a wired data telecommunications network.

Figure 3:
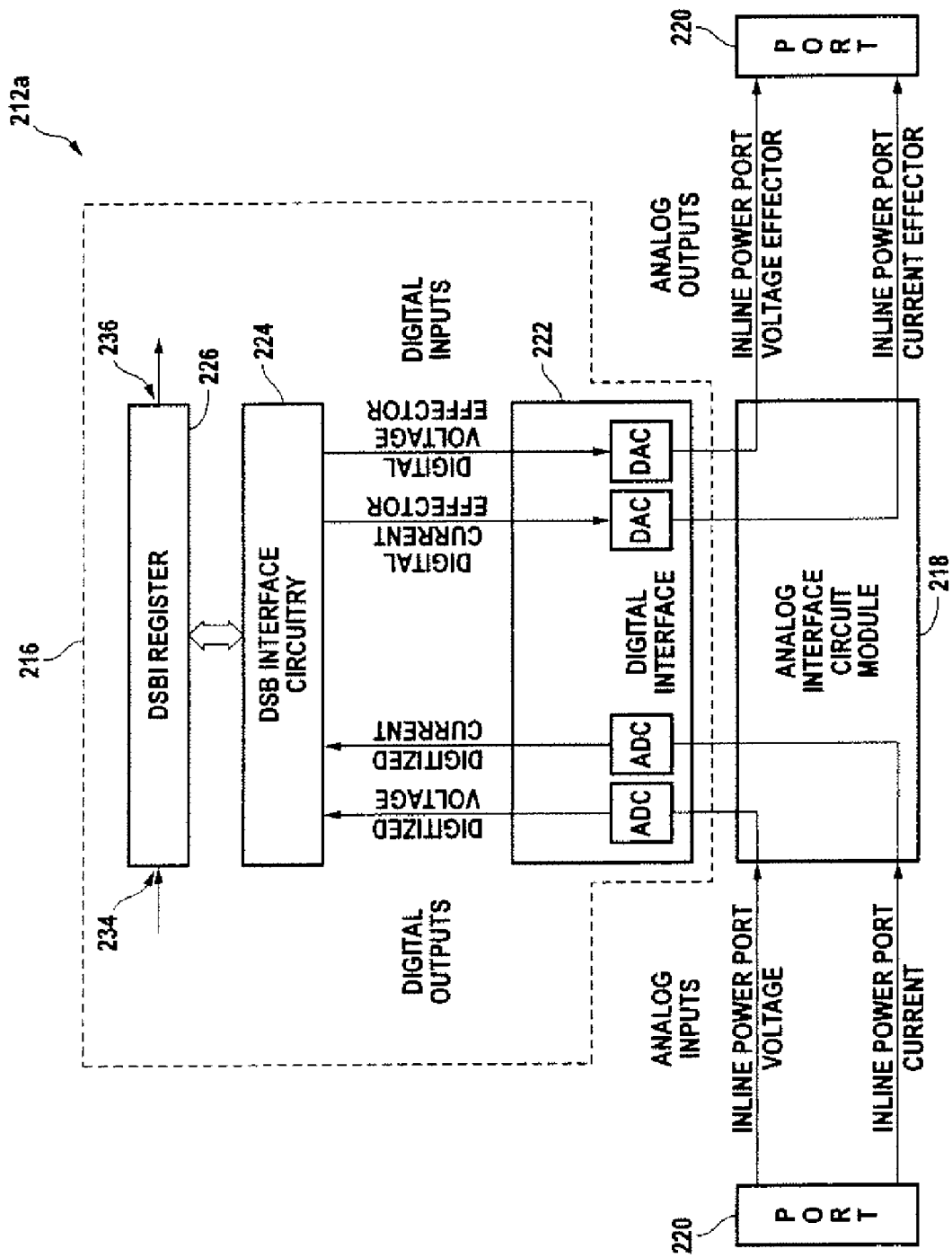
FIG. 3 is a system block diagram of an analog interface circuit module and its digital interface circuitry in accordance with one embodiment of the present invention.

FIG. 3 is a system block diagram of an analog interface circuit module (AICM) 212a and its digital interface circuitry 216 in accordance with one embodiment of the present invention.

The AICM 212a includes analog component 218 which receives analog-valued signals representing inline power port voltage and current from one or more attached inline powered ports 220. One module 212a can service one or more inline powered ports 220 by cycling among them in either a time-sliced manner, a demand-based manner, or a combination of the two. AICM 212a also sends analog-valued voltage and current effector signals to the inline powered port circuitry to cause that circuitry to adjust its voltage and/or current in response to commands from the digital controller 208. The analog signals are converted to digital in digital interface 222 where conventional analog to digital converters (ADCs) convert the inline power port voltage and current signals to digital-valued signals which can then be transmitted to the digital controller 208. Similarly, the digital interface 222 also includes digital to analog converters (DACs) for converting the digital voltage and current effector signals from the digital controller 20S to corresponding analog-valued signals for application to the inline powered port circuitry 220. Such central resources as ADCs and DACs may be shared, if desired, using a conventional multiplexer circuit, as is well known to those of ordinary skill in the art.

Note that the analog voltage and current values may be measured in any suitable manner using conventional techniques available to those of ordinary skill in the art for measuring current and voltage.

The digital interface circuitry 216 also includes DSB interface circuitry 224 which buffers and controls the aforementioned digital signals for communication with the DSBI register 226 which forms part of the DSB 214 as discussed above.

Digital communications occur as follows: a digital signal generated at the digital controller 208 is transmitted onto the DSB 214 at a DSBI output 230 of the digital controller 208 in the form of a digital signal of width W (in bits) and length L (in bits). What is needed is to shift the contents of the AICM registers into the digital controller 208 over the DSB 214 and to shift new data and/or instructions from the digital controller 208 over the DSB 214 to the respective AICM registers. If the m AICM registers are thought of as one big shift register, then it has a length of m*L bits and a width of W bits. Thus, the last L bits of the signal are shifted by this operation to the first AICM 212a, the next to last L bits of the signal are shifted to the second AICM 212b, and so on. Bits are shifted from the AICM registers back into a DSBI input 232 of digital controller 208. Each DSBI register 226 at each corresponding AICM (e.g., AICM 212a) has a DSBI input 234 and a DSBI output 236.

Figure 4A:
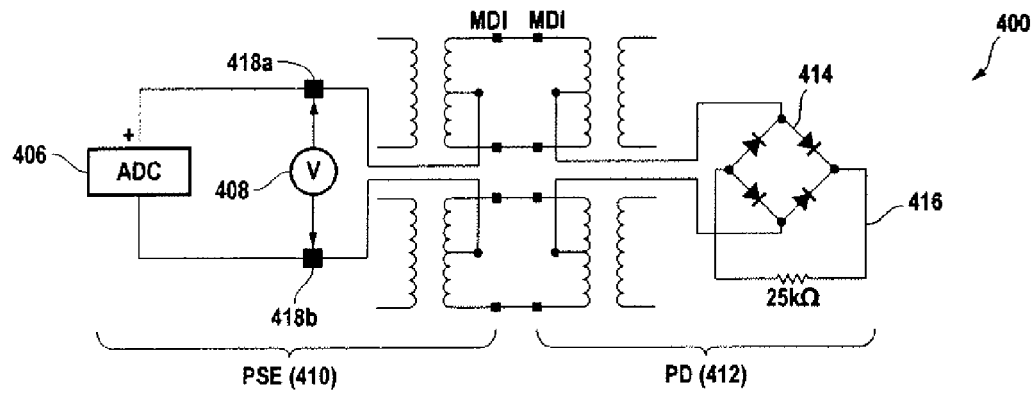
FIG. 4A is an electrical schematic diagram illustrating the configuration of a PSE and a PD in accordance with the present invention during the inline power discover phase.
Figure 4B:
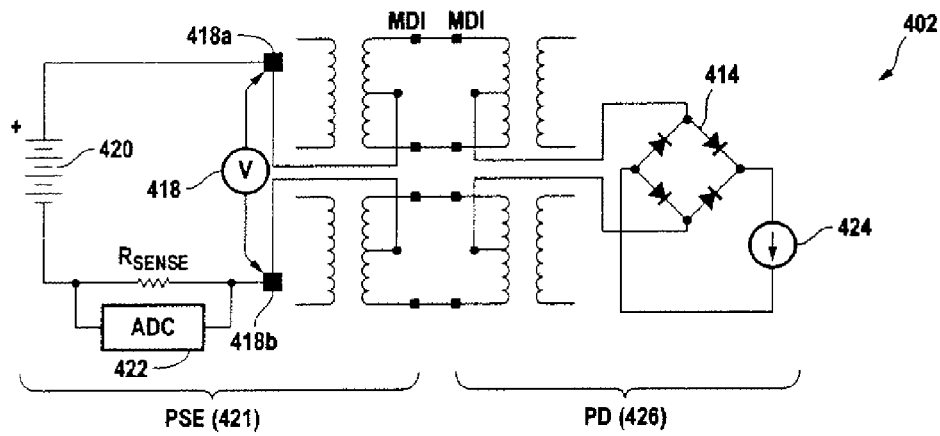
FIG. 4B is an electrical schematic diagram illustrating the configuration of a PSE and a PD in accordance with the present invention during the inline power classification phase.
Figure 4C:
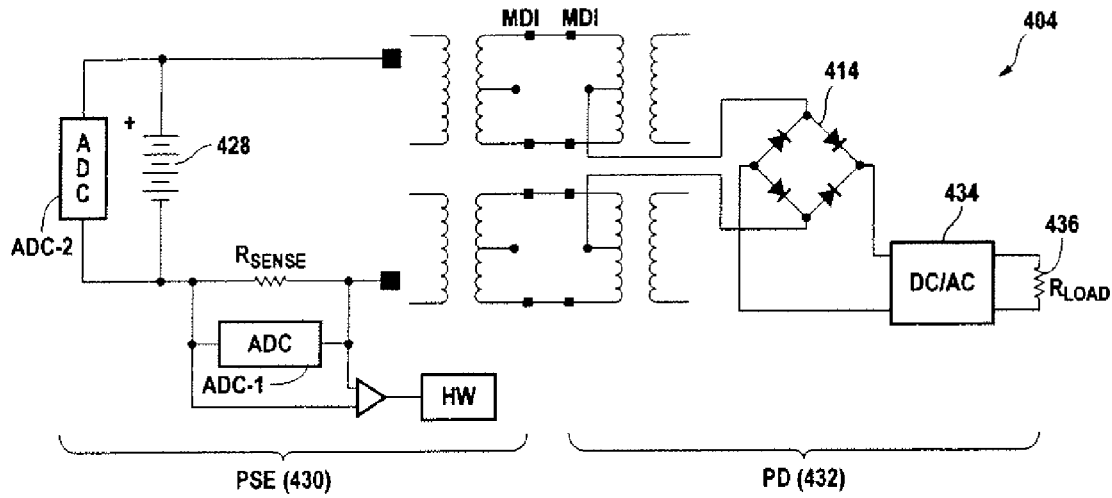
FIG. 4C is an electrical schematic diagram illustrating the configuration of a PSE and a PD in accordance with the present invention during the inline power powered device powering phase.

FIG. 4A is an electrical schematic diagram illustrating a configuration 400 of a PSE and a PD in accordance with the present invention during the inline power discovery phase. FIG. 4B is an electrical schematic diagram illustrating a configuration 402 of a PSE and a PD in accordance with the present invention during the inline power classification phase. FIG. 4C is an electrical schematic diagram illustrating a configuration 404 of a PSE and a PD in accordance with the present invention during the inline power powered device powering phase.

In configuration 400 an ADC 406 is coupled in parallel with a current source 408 at PSE 410. The PSE 410 is coupled as discussed above over a wired data telecommunications network such as Ethernet through Media Dependent Interfaces (MDIs) to PD 412 which includes a full wave bridge rectifier 414 (other forms of rectification could be used) and an identity network 416 such as a 25 k ohm resistor.

Discovery or detection is accomplished in one embodiment of the invention by stimulating the current source 408 (possibly with a DAC—not shown) to produce a first current i(1) and measuring a responsive voltage v(1) across nodes 418 (418a and 418b) with ADC 406. Then the current source 408 is stimulated to produce a second current i(2) and a second responsive voltage v(2) is measured across nodes 418. A resistance is then calculated using the formula R=(i(2)−i(1))/(v(2)−v(1)). If the resistance is within the acceptable range, then the classification phase is entered. If not, classification does not occur. The current source 408 in this case is implemented with a fixed current source to generate i(1) or i(2). It could, however, be implemented as a current output DAC which can output i(1) or i(2). Other methods of discovery may be used without departing from the essence of the present invention.

In configuration 402 (classification phase) a power source 420 (which may be implemented as a fixed voltage source as shown or, alternatively, as a voltage output DAC) provides a voltage to the PSE circuit 421. R(sense) is a sense resistor. An ADC 422 coupled in parallel with R(sense) is used to measure current i(class). Current i(class) is determined by the nature of the current sink 424 of the PD. The measured i(class) is used to classify the PD and set the maximum power (current) level to be provided to the PD 426 from the PSE 421. Note that a number of other means may be used to determine i(class).

In configuration 404 (powering phase) a power source 428 provides power at the PSE 430 for powering the PD 432. R(sense) is coupled as in configuration 402 to allow ADC-1 to measure port current (i(port)). Hardware (HW) is used to constantly monitor the current across R(sense) for a catastrophic over current condition. In such a condition, the circuit will be depowered to avoid damage. ADC-2 measures the port voltage v(port) across power source 428 at the port. Thus conventional hardware circuitry (HW) is used for critical instantaneous current measurements while the ADC-1 is used to measure current periodically for use by the software/firmware routines in the digital controller 208. Note that in this configuration 404, it is unlikely (but possible) that power source 428 would be implemented as a DAC because a reasonable amount of current will need to be supplied in the powering phase of operation thus making a different sort of power supply more practical in this application.

In the PD 432 a conventional DC/DC (direct current to direct current) converter 434 provides inline power to R(load) 436 in a conventional manner.

Figure 5:
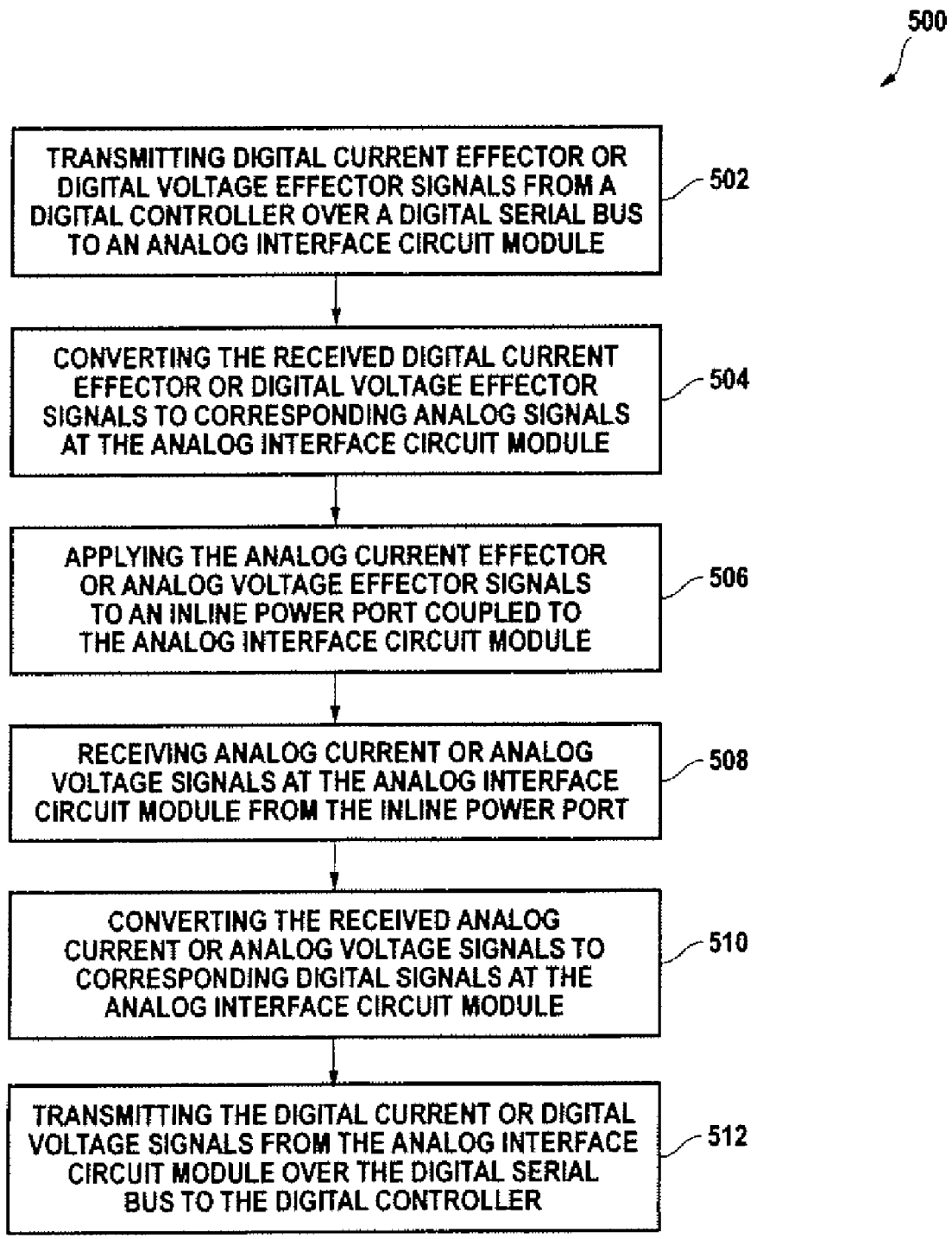
FIG. 5 is a process flow diagram illustrating a method for controlling inline power port current and voltage in accordance with one embodiment of the present invention.

FIG. 5 is a process flow diagram 500 illustrating a method for controlling inline power port current and voltage in accordance with one embodiment of the present invention.

Six steps are illustrated in FIG. 5. These are:

Step 502: Transmitting digital current effector or digital voltage effector signals from a digital controller over a digital serial bus to an analog interface circuit module;

Step 504: Converting the received digital current effector or digital voltage effector signals to corresponding analog signals at the analog interface circuit module;

Step 506: Applying the analog current effector or analog voltage effector signals to an inline power port coupled to the analog interface circuit module;

Step 508: Receiving analog current or analog voltage signals at the analog interface circuit module from the inline power port;

Step 510: Converting the received analog current or analog voltage signals to corresponding digital signals at the analog interface circuit module; and Step 512: Transmitting the digital current or digital voltage signals from the analog interface circuit module over the digital serial bus to the digital controller.

In accordance with the described method, the operation of the inline power ports is effected to carry out inline power discovery, classification, operation and protection steps in accordance with, for example, the IEEE 802.3af standard, or other standards or proprietary systems to be implemented.

Using the DSB approach described herein, it is also possible to extend the instruction word length (L) used in the digital interface circuitry 216 in the future without any need to completely rewrite the underlying program instructions. This is achieved as follows. Say, for example, that the present word length L is 8 bits and in the future it is desired to develop a more complex system that requires 16 bits of word length. Instead of shifting L multiplied by the number of AICMs in the system through the DSB, we shift L' (the new value of L) multiplied by the number of AICMs in the system. For "old" instructions, a null operation code "NULL" is sent as the bits corresponding to the "extra" bits. Thus if the "old" instruction was: [DDDD DDDD] the new instruction would be [xxxx xxxx DDDD DDDD] or [DDDD DDDD xxxx xxxx] where "xxxx xxxx" is the code for the NULL. The digital controller 208 can easily be programmed to carry out this function as can some future digital controller. As will now be apparent to those of ordinary skill in the art having the benefit of this disclosure, the word length can be extended essentially indefinitely using this approach and this approach has application to other sorts of digital serial bus implementations beyond the field of network devices.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. Inline power control circuitry, comprising:
analog interface circuitry for coupling to a plurality of inline powered ports of a network communications device, the analog interface circuitry operative to receive an analog input signal from each port and to generate an analog output signal for each port, each analog input signal conveying a sensed electrical value of the respective port and each analog output signal controlling a controlled electrical value of the respective port;
digital interface circuitry operative to convert between the analog input and output signals of the ports and corresponding digital input and output signals, each digital input signal conveying the corresponding sensed electrical value of the respective port and each digital output signal controlling the corresponding controlled electrical value of the respective port;
digital bus interface circuitry coupling the digital interface circuitry to a digital communications bus; and
a digital controller operatively coupled to the digital communications bus for digital communications with the digital interface circuitry by which the digital controller (i) receives the digital input signals to obtain the respective sensed electrical values of the ports and (ii) provides the digital output signals to control the respective controlled electrical values of the ports.

2. Inline power control circuitry according to claim 1, wherein the inline powered ports are serviced by the digital controller in at least one of a time-sliced manner and a demand-based manner.

3. Inline power control circuitry according to claim 1, wherein the analog input signal for each port conveys a sensed port current or a sensed port voltage of the port.

4. Inline power control circuitry according to claim 1, wherein the analog output signal for each port is a port current effector or a port voltage effector for controlling a port current or port voltage respectively of the port.

5. Inline power control circuitry according to claim 1, wherein the digital communications bus is a serial digital communications bus and the digital bus interface circuitry includes a digital serial bus register, and wherein the digital controller engages in the digital communications by accessing the digital serial bus register.

6. Inline power control circuitry according to claim 1, wherein the analog interface circuitry, digital interface circuitry and digital bus interface circuitry are included in a first analog interface circuit module, and further comprising one or more additional analog interface circuit modules for coupling to a respective plurality of additional inline powered ports, each additional analog circuit module also including respective analog interface circuitry, digital interface circuitry and digital bus interface circuitry and respective digital input signals and digital output signals for corresponding sensed and controlled electrical values of the additional inline powered ports, the first and additional analog interface circuit modules all being connected to the digital communications bus for digital communications with the digital controller by which the digital controller receives the respective digital input signals from and provides the respective digital output signals for each of the analog interface circuit modules.

7. Inline power control circuitry according to claim 6, wherein the digital communications bus is a serial communications bus.

8. Inline power control circuitry according to claim 7, wherein the digital controller and analog interface circuit modules are connected to the serial communications bus in a loop configuration.

9. Inline power control circuitry according to claim 1, wherein the digital controller includes an interface to a network device CPU via which the digital controller engages in high-level communications with the network device CPU.

10. A network communications device, comprising:
a plurality of inline powered ports each configured to be connected to a respective powered communications link and each operable to provide electrical power to a powered device via the respective powered communications link; and one or more inline power control circuits each coupled to a respective set of the inline powered ports, each power control circuit including:

analog interface circuitry for coupling to the respective set of inline powered ports, the analog interface circuitry operative to receive an analog input signal from each port of the set of ports and to generate an analog output signal for each port of the set of ports, each analog input signal conveying a sensed electrical value of the respective port and each analog output signal controlling a controlled electrical value of the respective port;

digital interface circuitry operative to convert between the respective analog input and output signals of the ports and corresponding digital input and output signals, each digital input signal conveying the corresponding sensed electrical value of the respective port and each digital output signal controlling the corresponding controlled electrical value of the respective port;

digital bus interface circuitry coupling the digital interface circuitry to a digital communications bus; and a digital controller operatively coupled to the digital communications bus for digital communications with the digital interface circuitry by which the digital controller (i) receives the digital input signals of the set of ports to obtain the respective sensed electrical values of the ports and (ii) provides the digital output signals to the set of ports to control the respective controlled electrical values of the ports.

11. A network communications device according to claim 10, wherein the ports of each set of ports are serviced by the digital controller of the respective inline power control circuit in at least one of a time-sliced manner and a demand-based manner.

12. A network communications device according to claim 10, wherein the analog input signal for each port conveys a sensed port current or a sensed port voltage of the port.

13. A network communications device according to claim 10, wherein the analog output signal for each port is a port current effector or a port voltage effector for controlling a port current or port voltage respectively of the port.

14. A network communications device according to claim 10, wherein the digital communications bus is a serial digital communications bus and the digital bus interface circuitry includes a digital serial bus register, and wherein the digital controller engages in the digital communications by accessing the digital serial bus register.

15. A network communications device according to claim 10, wherein the inline power control circuits are connected to the serial communications bus in a loop configuration.

16. A network communications device according to claim 10, further including a network device CPU, and wherein the digital controller of each of the inline power control circuits includes a respective interface to the network device CPU via which the digital controller engages in high-level communications with the network device CPU.

17. A method of operating a network communications device having (1) a plurality of inline powered ports each configured to be connected to a respective powered communications link and each operable to provide electrical power to a powered device via the respective powered communications link, and (2) one or more inline power control circuits each coupled to a respective set of the inline powered ports, comprising:

at analog interface circuitry of each inline power control circuit, the analog interface circuitry coupling the inline power control circuit to the respective set of ports, receiving an analog input signal from each port of the respective set of ports and generating an analog output signal for each port of the respective set of ports, each analog input signal conveying a sensed electrical value of the respective port and each analog output signal controlling a controlled electrical value of the respective port;

at a digital interface circuitry of each inline power control circuit, converting between the analog input and output signals of the respective set of ports and corresponding digital input and output signals, each digital input signal conveying the corresponding sensed electrical value of the respective port and each digital output signal controlling the corresponding controlled electrical value of the respective port; and at a digital controller operatively coupled to the digital communications bus, engaging in digital communications with the digital interface circuitry by which the digital controller (i) receives the digital input signals of the respective set of ports to obtain the respective sensed electrical values of the ports and (ii) provides the digital output signals to the respective set of ports to control the respective controlled electrical values of the ports.

18. A method according to claim 17, wherein the ports of each set of ports are serviced by the digital controller of the respective inline power control circuit in at least one of a time-sliced manner and a demand-based manner.

19. A method according to claim 17, wherein the analog input signal for each port conveys a sensed port current or a sensed port voltage of the port.

20. A method according to claim 17, wherein the analog output signal for each port is a port current effector or a port voltage effector for controlling a port current or port voltage respectively of the port.

* * * * *